United States Patent [19]

Kirchberg et al.

[11] Patent Number: 5,038,095
[45] Date of Patent: Aug. 6, 1991

[54] CONTROL FOR A DC LINK POWER CONVERSION SYSTEM

[75] Inventors: Maurice Kirchberg, Dubuque, Iowa; Alexander Cook, Rockford, Ill.

[73] Assignee: Sundstrand Corporation, Rockford, Ill.

[21] Appl. No.: 445,997

[22] Filed: Dec. 5, 1989

[51] Int. Cl.⁵ .............................. H02K 11/00
[52] U.S. Cl. ........................ 322/58; 322/29; 363/40; 363/46
[58] Field of Search ............ 322/10, 29, 30, 31, 322/32, 58; 363/37, 40, 46, 47, 48

[56] References Cited

U.S. PATENT DOCUMENTS

| | | | |
|---|---|---|---|
| 3,510,753 | 5/1970 | Lawn | 363/46 |
| 3,600,663 | 8/1971 | Wagner | 363/46 |
| 4,035,713 | 7/1977 | Kawamoto et al. | 322/28 |
| 4,340,849 | 7/1982 | Kuhn | 322/58 X |
| 4,393,345 | 7/1983 | Fork et al. | 322/29 X |
| 4,786,852 | 11/1988 | Cook | 322/10 |
| 4,788,653 | 11/1988 | Henderson et al. | 322/58 X |

Primary Examiner—Steven L. Stephan
Assistant Examiner—Kristine Peckman
Attorney, Agent, or Firm—Marshall, O'Toole, Gerstein, Murray & Bicknell

[57] ABSTRACT

A control for a DC link power conversion system including a brushless generator having a main generator portion including an armature winding and a rectifier coupled to the armature winding of the main generator portion which converts AC power developed therein into DC power on a DC link comprises a circuit for sensing a parameter of the DC power, a circuit coupled to the sensing circuit for generating an alternating current waveform having a harmonic content dependent upon the sensed DC power parameter and a circuit coupled to the generating circuit for modifying the AC power developed in the main generator armature winding with the alternating current waveform so that the DC power has a certain AC component superimposed thereon.

9 Claims, 5 Drawing Sheets

CONTROL FOR A DC LINK POWER CONVERSION SYSTEM

TECHNICAL FIELD

The present invention relates generally to power converter controls, and more particularly to a control for a DC link power conversion system.

BACKGROUND ART

Power conversion systems of the DC link type convert AC power supplied by an AC power source into DC power on a DC link. One example of such a power system is a variable-speed, constant-frequency (VSCF) power generating system which converts AC power produced by a brushless, synchronous generator coupled to a variable-speed prime mover into DC power on a DC link which is in turn coupled to an inverter. The inverter is controlled to produce constant-frequency AC power from the DC power on the DC link which may in turn be filtered by a filter and provided to one or more AC loads.

In such types of systems, it is important that the harmonics in the power produced by the inverter be controlled so that the size and weight of the filter may be minimized. Typically, the switches of the inverter are controlled in accordance with switching patterns established under the assumption that the DC link is truly "stiff", i.e. the DC link conducts pure DC power with no substantial AC components. However, it has been found that AC components are introduced on the DC link due to operation of the rectifier and inverter as well as by vibration of loads connected to the inverter. These AC components in turn cause the output of the inverter to have increased harmonic content, thus requiring a relatively large and heavy filter. Moreover, the harmonic content in the inverter output varies during operation of the VSCF system in a manner which cannot be controlled by modification of the switching patterns for the inverter alone.

SUMMARY OF THE INVENTION

In accordance with the present invention, a control for a DC link power converter controls the AC content in power produced on the DC link in a simple and effective manner.

More particularly, a control for a DC link power conversion system including a brushless generator having a main generator portion including an armature winding and a rectifier coupled to the armature winding of the main generator portion which converts AC output power developed therein into DC power in a DC link includes means for sensing a parameter of the DC power, means coupled to the sensing means for generating an alternating current waveform having a harmonic content dependent upon the sensed DC power parameter and means coupled to the generating means for modifying the AC power developed in the main generator portion armature winding with the alternating current waveform so that the DC power includes a certain AC component.

In the preferred embodiment, the generator further includes an exciter portion and the modifying means includes an exciter field winding magnetically linked with an exciter armature winding which is in turn coupled to a main generator portion field winding. The generating means preferably comprises a pulse-width modulation (PWM) controller and a switch coupled between the PWM controller and the exciter field winding. The PWM controller develops a pulse-width modulated waveform which modulates the generator output via the exciter field and exciter armature windings and the main generator portion field winding based upon the harmonics present on the DC link.

The control of the present invention introduces one or more AC components onto the DC link so that harmonic content in AC power produced by an inverter coupled to the DC link may be held to a specified limit.

DESCRIPTION OF THE PREFERRED EMBODIMENT

Figure 1:
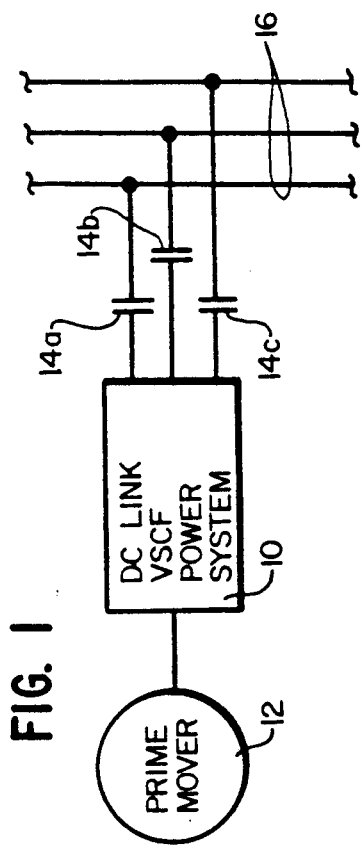
FIG. 1 comprises a block diagram of a power conversion system with which the control of the present invention may be used.

Referring now to FIG. 1, a DC link power system 10 produces electrical power from motive power supplied by a prime mover 12 which may be, for example, an aircraft jet engine. Preferably, the DC link power system is a variable-speed, constant-frequency (VSCF) power generating system which produces constant-frequency AC electrical power that is delivered through controllable contactors 14a, 14b and 14c to a load bus 16.

Figure 2:
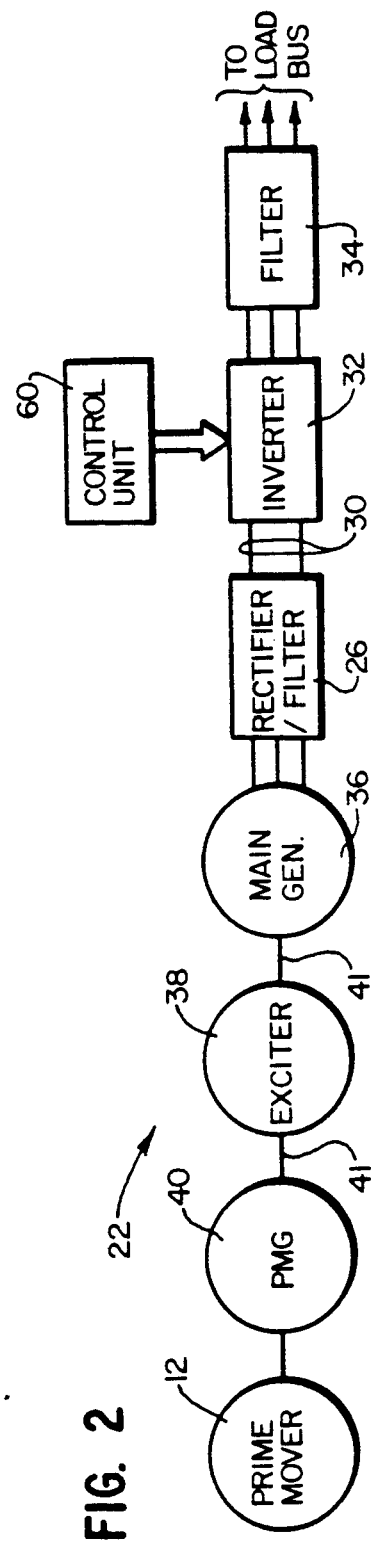
FIG. 2 is a combined mechanical and electrical block diagram of the VSCF system of FIG. 1.

Referring now to FIG. 2, the VSCF system 10 includes a brushless, synchronous generator 22 driven by the prime mover 12. The generator 22 develops polyphase, variable-frequency AC power which is converted into DC power by a rectifier/filter 26. The resulting DC power is provided over a DC link 30 to a polyphase inverter 32 which converts the DC power into three-phase constant-frequency AC power. This AC power may be filtered by an optional filter 34 and is provided via the set of controllable contactors 14a-14c to the load bus 16 as seen in FIG. 1.

Figure 3:
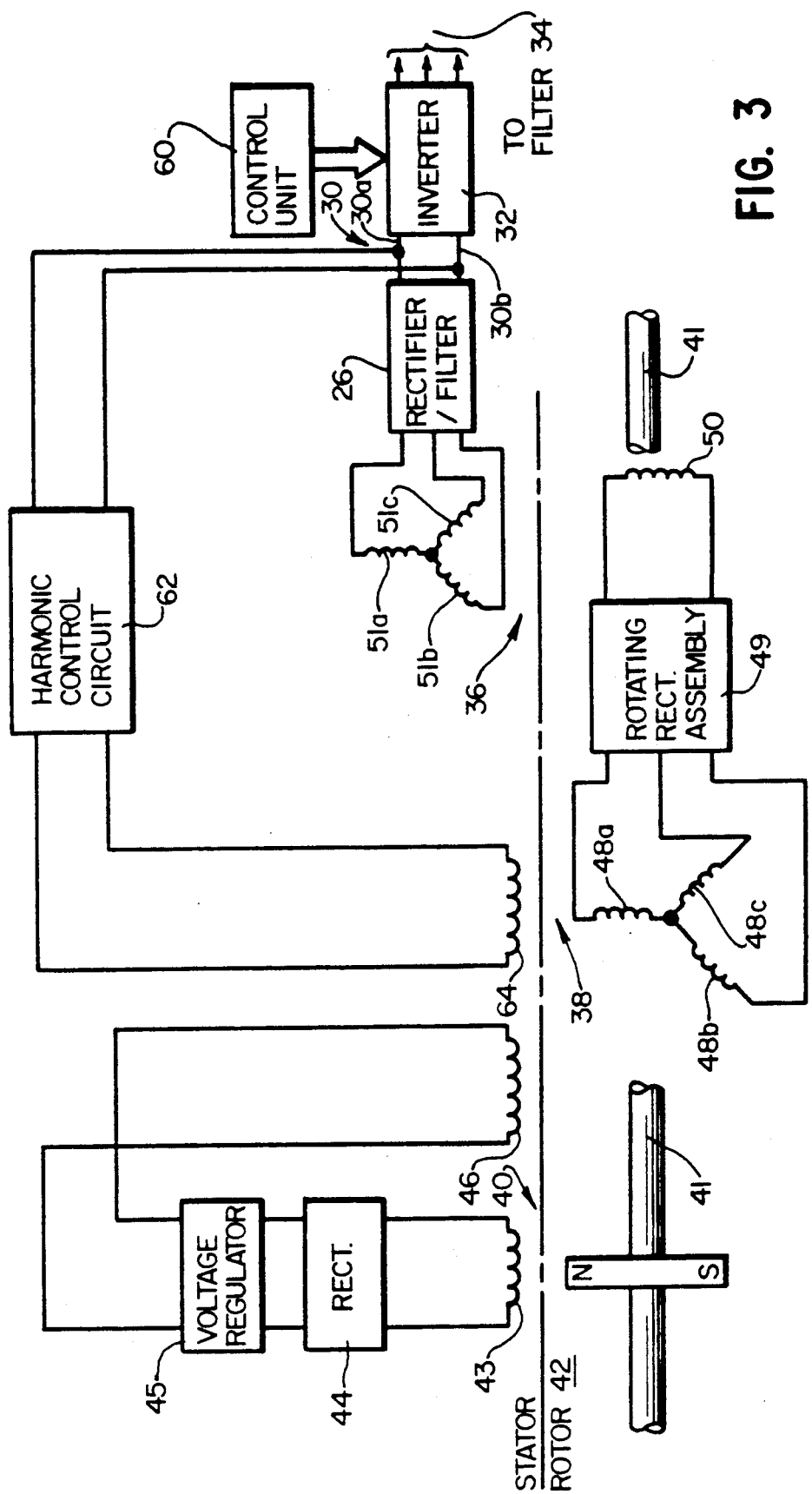
FIG. 3 is a combined schematic and block diagram of a portion of the system shown in FIG. 2.

As seen in FIG. 3, the generator 22 includes a main generator portion 36, an exciter portion 38 and a permanent magnet generator (PMG) 40, all of which include rotor structures mounted on a common shaft 41 of a rotor 42. Rotation of the common shaft 41 in turn causes polyphase power to be developed in an armature winding 43 of the PMG 40 which is in turn delivered to a rectifier 44 and a voltage regulator 45. The rectifier 44 and voltage regulator 45 deliver a controlled magnitude of DC current to a first exciter field winding 46. This current induces an AC voltage in armature windings 48a-48c of the exciter 38 which is rectified by a rotating rectifier assembly 49. The resulting DC power is supplied to a field winding 50 of the main generator 36.

Rotation of the common shaft 41 while the field current is flowing in the field winding 50 of the main generator portion 36 in turn causes polyphase voltages to be developed across armature windings 51a–51c of the main generator portion 36. These voltages are supplied to the rectifier/filter 26 which in turn converts these voltages into first and second DC voltages on DC link conductors 30a, 30b.

The inverter 32 includes semiconductor switches connected in a conventional bridge configuration which are operated by a control unit 60 to convert the DC power on the DC link 30 into AC power which is delivered to the filter 34 and the load bus 16.

As is well known, the rectifier/filter 26 does not produce pure DC power on the DC link 30; rather, DC power having a substantial AC ripple component superimposed thereon is produced by the rectifier/filter 26. Also, operation of the switches in the inverter 32 by the control unit 60 and vibration of one or more loads coupled to the load bus 16 introduce further AC components on the DC link 30. These AC components increase the harmonic content in the inverter output and thus necessitate the use of a large and heavy filter 34. The harmonic content in the inverter output can be reduced somewhat by proper selection of switching patterns for the switches in the inverter 32; however, the degree of harmonic reduction in the inverter output which can be accomplished in this fashion is limited.

As seen in FIG. 3, harmonic content in the inverter output 32 may be further reduced through the use of a control circuit 62 according to the present invention. The control circuit 62 is responsive to a parameter of the DC power on the DC link 30. In first and second embodiments of the invention, the control circuit 62 detects the voltage across the DC link conductors 30a and 30b and produces an alternating current waveform which is supplied to a second exciter field winding 64. The current flowing in the exciter field winding 64 modulates the voltages induced in the armature windings 48a–48c, in turn causing AC components to be produced in the main field winding 50 and the main armature windings 51a–51c. The rectifier/filter 26 thus receives AC power having a substantial fundamental frequency component and one or more additional components at frequencies other than the fundamental frequency. This power is rectified and filtered by the rectifier/filter 26 to produce DC power having one or more AC components superimposed thereon. The AC components thus produced on the DC link 30 partially or fully cancel one or more harmonics on the link 30 and result in a substantially lowered harmonic content in the output of the inverter 32 so that the size and weight of the filter 34 may be reduced.

Figure 4:
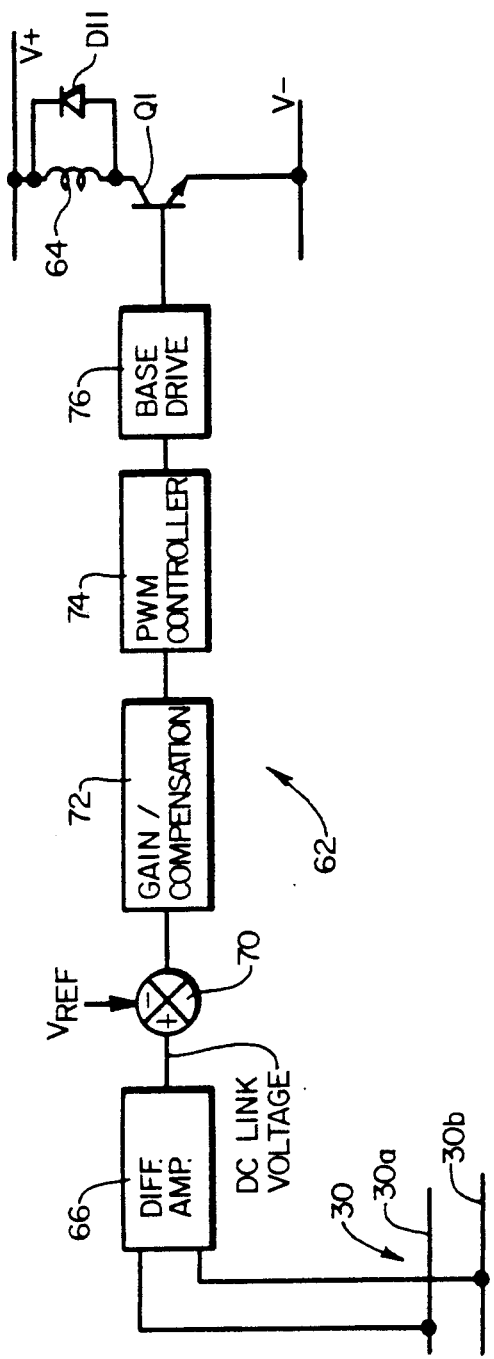
FIG. 4 is a combined schematic and block diagram of a first embodiment of the control of the present invention.

Referring now to FIG. 4, a first embodiment of the harmonic control circuit 62 includes a differential amplifier 66 which develops a signal representing the voltage across the DC link conductors 30a, 30b. This signal, as well as a reference signal $V_{REF}$ representing a particular DC link voltage, are coupled to noninverting and inverting inputs of a summer 70. The summer 70 develops an error signal which is processed by a gain and compensation unit 72 to produce a command signal for a pulse-width modulation (PWM) controller 74. The controller 74 develops a PWM waveform which is amplified and isolated, as necessary, by a base drive circuit 76. The resulting base drive signal is supplied to the base of a transistor Q1 which is coupled in series with the exciter field winding 64 between positive and negative voltages V+ and V−. A diode D1 is provided to dissipate transients arising from the switching of currents through the winding 64.

Figure 5:
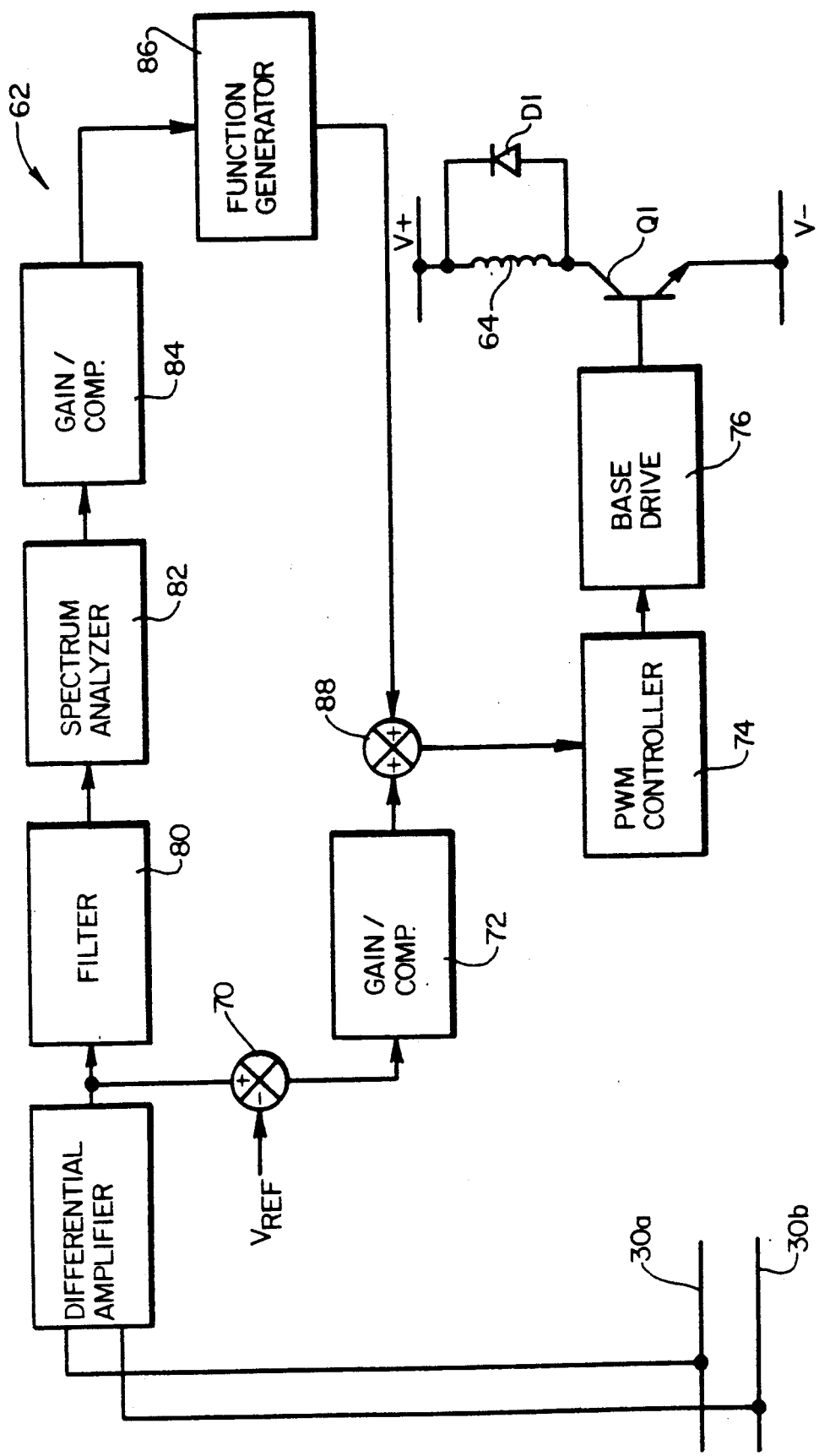
FIG. 5 is a combined schematic and block diagram of a second embodiment of the control of the present invention.

Referring now to FIG. 5, a second embodiment of the control 62 is illustrated. The control 62 includes the differential amplifier 66, the summer 70, the gain and compensation unit 72, the PWM controller 74 and the base drive circuit 76 which develops base drive signals for the transistor Q1 as noted above in connection with FIG. 4. In addition, a filter 80, a spectrum analyzer 82, a gain and compensation unit 84, a function generator 86 and a further summer 88 are provided to modify the input to the PWM controller 74 in a fashion noted in greater detail hereinafter.

The filter 80 is of the high-pass type and filters out AC components below the second harmonic of the lowest fundamental frequency produced by the main generator 36 during operation of the VSCF system 10. The spectrum analyzer 82 identifies the harmonics present in the power developed at the output of the filter 80 and develops signals representing the amplitude and phase displacement of each harmonic. This information is passed to the gain and compensation unit 84 which provides compensation for the response of various elements in the system, for example the generator, feeders connecting the filter to the load bus, and the like.

The spectrum analyzer 82 and the gain and compensation unit 84 may be implemented by a microprocessor or by discrete components, as desired.

The function generator 86 develops an AC waveform based upon the signals produced by the gain and compensation unit 84. The AC waveform is summed by the summer 88 with the output of the gain and compensation unit 72. The resulting signal is then applied as a control input to the PWM controller 74. The PWM signals developed by the controller 74 and the base drive circuit 76 cause the transistor Q1 to modulate the current through the exciter field winding 64 in a manner which in turn causes cancellation of one or more harmonics on the DC link 30. The circuitry of FIG. 5 operates the transistor Q1 to introduce harmonics on the DC link which are of the same magnitude but 180° out of phase with the harmonics already present thereon so that such harmonics are cancelled.

Figure 6:
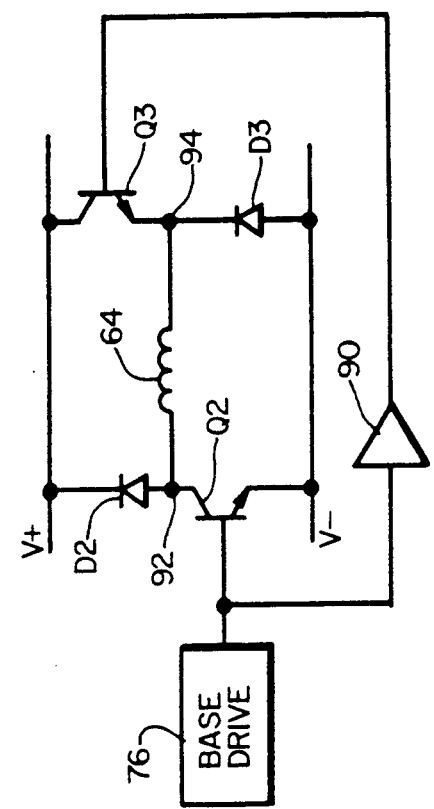
FIG. 6 is a simplified schematic diagram of an alternative driver circuit for energizing the winding 64 of FIG. 3.

FIG. 6 illustrates an alternative driver circuit for suitably energizing the winding 64. The transistor Q1 of FIGS. 4 and 5 is replaced by transistors Q2 and Q3 which are operated by the base drive circuit 76. The transistor Q2 is coupled in series with the diode D2 across the voltages V+ and V− and the base of the transistor Q2 is coupled directly to the output of the base drive circuit 76. The transistor Q3 and the diode D3 are coupled in series across the voltages V+ and V−. The transistor Q3 receives a level shifted output from the base drive circuit 76 as developed by a level shifting amplifier 90. The winding 64 includes a first end coupled to a junction 92 between the transistor Q2 and the diode D2 and a second end coupled to a junction 94 between the transistor Q3 and the diode D3. The base drive circuit 76 alternately operates the transistors Q2 and Q3 to induce an alternating current therein which in turn results in the cancellation of one or more AC components on the DC link 30, as noted above.

If desired, a different driver circuit may be substituted for those disclosed in the drawings.

Figure 7:
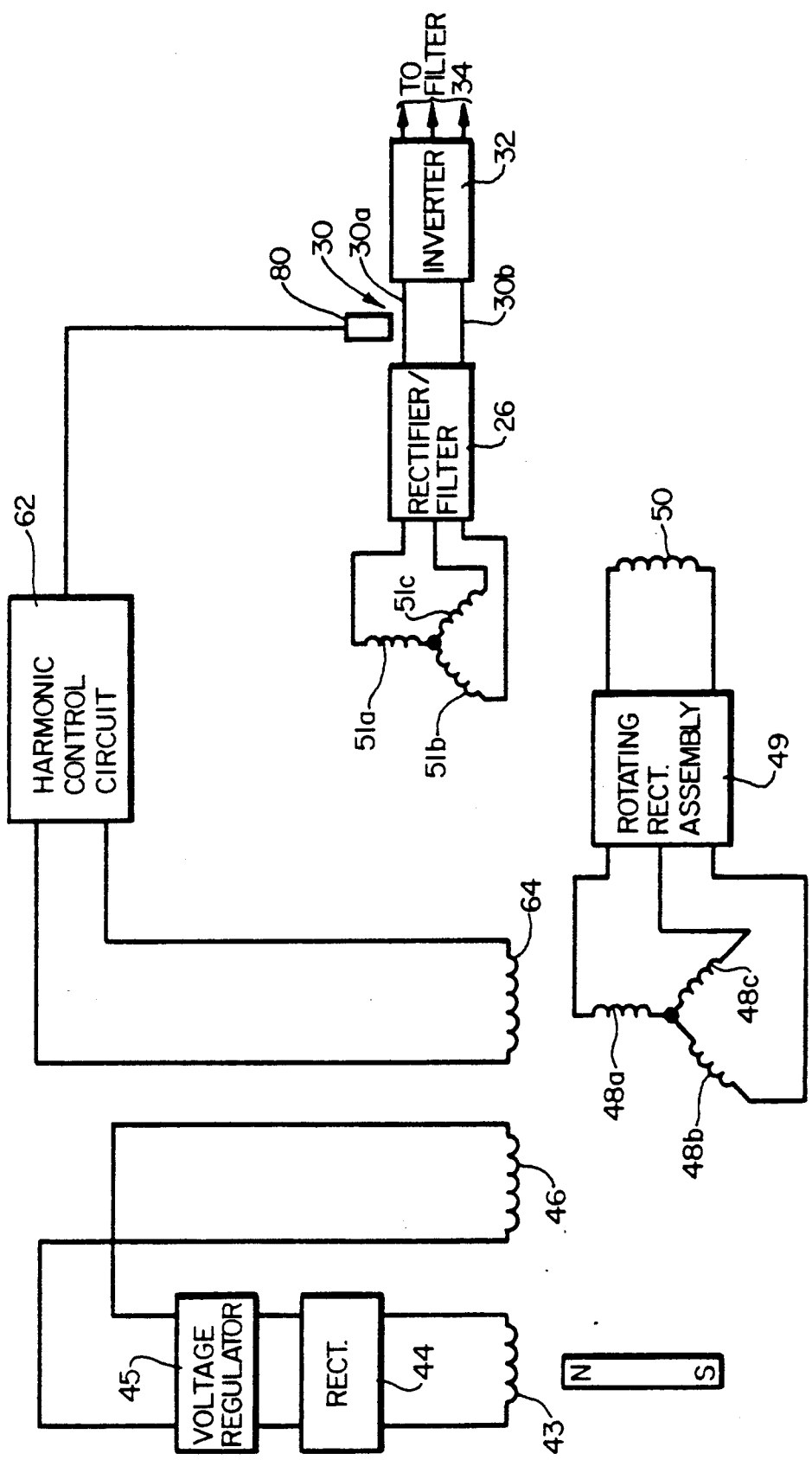
FIG. 7 is a diagram similar to FIG. 3 illustrating a further embodiment of the present invention.

As seen in FIG. 7, either embodiment of the harmonic control circuit 62 may be modified so that it is instead responsive to the current on the DC link as detected by a current sensor 100. In this case, the dynamic response of the control 62 is improved. This would, however, require a different transfer function for the gain and compensation units 72 and 84.

Alternatively, the output voltage or current developed by the inverter 32 at a point of regulation (POR) downstream of the filter 34 is also representative of the parameter of the power on the DC link 30 and a signal representative thereof may be used by the harmonic control circuit 62 to derive the alternating current waveform which is provided to the winding 64. Again, this may require modification of the transfer functions for the units 72, 84.

It should be noted that the present invention is not limited to use with VSCF systems, but may be used in any type of power conversion system which converts AC power into DC power on DC conductors.

We claim:

1. A control for a DC link power conversion system including a brushless generator having a main generator portion including a field winding and an armature winding and an exciter portion having a first field winding and an armature winding coupled to the main generator field winding, the power conversion system further including a rectifier coupled to the armature winding of the main generator portion which converts AC power developed therein into DC power on a DC link, comprising:

means for sensing a parameter of the DC power;
   means coupled to the sensing means for generating an alternating current waveform having a harmonic content dependent upon the sensed DC power parameter; and
   mean coupled to the generating means for modifying the AC power developed in the main generator portion armature winding with the alternating current waveform so that the DC power has a certain AC component, the modifying means including a second exciter field winding magnetically linked with the exciter armature winding.

2. The control of claim 1, wherein the generating means comprises a pulse-width modulation (PWM) controlled and a switch coupled between the PWM controller and the exciter field winding.

3. A control for a variable-speed, constant-frequency power conversion system including a brushless generator having an exicter portion and a main generator portion each having magnetically linked field and armature windings wherein the exciter portion armature winding is coupled to the main generator portion field winding, a rectifier coupled to the armature winding of the main generator portion which converts AC power developed therein into DC power on a DC link and an inverter coupled to the DC link which converts the DC power into constant-frequency AC power at an output thereof, comprising:

means coupled to one of the DC link and the inverter output for sensing a parameter of the DC power; and
   means coupled to the exciter field winding and responsive to the sensing means for applying an alternating current waveform to the exciter field winding to cause the inverter to develop AC power having a certain harmonic content, the applying means including means coupled to the sensing means for deriving an error signal representing the deviation of the DC link voltage from a desired level and means for generating an alternating current waveform from the error signal.

4. The control of claim 3, wherein the sensing means comprises means coupled to the DC link for developing a signal representing the voltage on the DC link.

5. The control of claim 3, wherein the generating means comprises a pulse-width modulation (PWM) controller and a switch coupled between the PWM controller and the exciter field winding.

6. The control of claim 5, further including a filter coupled to the sensing means for filtering an output produced thereby, a spectrum analyzer which develops signals identifying harmonics produced on the DC link, a function generator which produces an AC waveform from the signals produced by the spectrum analyzer and a summer having inputs coupled to the deriving means and the function generator and an output coupled to the PWM controller for summing the AC waveform with the error signal to derive a control input for the PWM controller.

7. The control of claim 3, wherein the sensing means comprises means coupled to the inverter output for developing a signal representing a parameter of the power developed by the inverter.

8. The control of claim 3, wherein the sensing means comprises means coupled to the inverter output for developing a signal representing the output current of the inverter.

9. The control of claim 3, wherein the sensing means comprises means coupled to the inverter output for developing a signal representing the output voltage of the inverter.

* * * * *